United States Patent [19]
McKee

[11] Patent Number: 5,788,310
[45] Date of Patent: Aug. 4, 1998

[54] PICKUP TRUCK BED LINER DIVIDING SYSTEM

[76] Inventor: Eric R. McKee, RR 1, Foxboro Ontario, Canada, K0K 2B0

[21] Appl. No.: 787,948

[22] Filed: Jan. 23, 1997

[51] Int. Cl.⁶ .................................................. B62D 33/00
[52] U.S. Cl. ............................ 296/39.2; 410/80; 114/75
[58] Field of Search .......................... 296/39.1, 39.2; 410/80, 90, 91, 94, 97, 132, 138; 114/75

[56] References Cited

U.S. PATENT DOCUMENTS 4,222,695  9/1980  Sarides ............................ 410/91
5,131,709  7/1992  Spica ............................. 296/39.1
5,599,055  2/1997  Brown ............................ 296/39.2
5,655,863  8/1997  Mundt ............................ 296/39.2

*Primary Examiner*—Jesus D. Sotelo

[57] ABSTRACT

A new Pickup Truck Bed Liner Dividing System for preventing cargo of various shapes and sizes from moving within a pickup truck bed. The inventive device includes a swaged liner, a plurality of vertical cylindrical cavities within the swaged liner, a plurality of pegs for selectively being positioned within the vertical cylindrical cavities adjacent to cargo, and a storage box for storage of the pegs. The pegs selectively positioned adjacent to the cargo prevent movement of the cargo thereby preventing damage to the cargo and the pickup truck.

7 Claims, 3 Drawing Sheets

5,788,310

PICKUP TRUCK BED LINER DIVIDING SYSTEM

BACKGROUND OF THE INVENTION

1. Field of the Invention

The present invention relates to Bed Liner Devices and more particularly pertains to a new Pickup Truck Bed Liner Dividing System for preventing cargo of various shapes and sizes from moving within a pickup truck bed.

2. Description of the Prior Art

The use of Bed Liner Devices is known in the prior art. More specifically, Bed Liner Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Bed Liner Devices include U.S. Pat. No. 5,240,301; U.S. Pat. No. 5,044,682; U.S. Pat. No. 5,259,712; U.S. Pat. No. 5,207,472; U.S. Design Patent 338,860 and U.S. Pat. No. 4,231,606.

While these devices fulfill their respective, particular objectives and requirements, the aforementioned patents do not disclose a new Pickup Truck Bed Liner Dividing System. The inventive device includes a swaged liner, a plurality of vertical cylindrical cavities within the swaged liner, a plurality of pegs for selectively being positioned within the vertical cylindrical cavities adjacent to cargo, and a storage box for storage of the pegs.

In these respects, the Pickup Truck Bed Liner Dividing System according to the present invention substantially departs from the conventional concepts and designs of the prior art, and in so doing provides an apparatus primarily developed for the purpose of preventing cargo of various shapes and sizes from moving within a pickup truck bed.

SUMMARY OF THE INVENTION

In view of the foregoing disadvantages inherent in the known types of Bed Liner Devices now present in the prior art, the present invention provides a new Pickup Truck Bed Liner Dividing System construction wherein the same can be utilized for preventing cargo of various shapes and sizes from moving within a pickup truck bed.

The general purpose of the present invention, which will be described subsequently in greater detail, is to provide a new Pickup Truck Bed Liner Dividing System apparatus and method which has many of the advantages of the Bed Liner Devices mentioned heretofore and many novel features that result in a new Pickup Truck Bed Liner Dividing System which is not anticipated, rendered obvious, suggested, or even implied by any of the prior art Bed Liner Devices, either alone or in any combination thereof.

To attain this, the present invention generally comprises a swaged liner, a plurality of vertical cylindrical cavities within the swaged liner, a plurality of pegs for selectively being positioned within the vertical cylindrical cavities adjacent to cargo, and a storage box for storage of the pegs.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Pickup Truck Bed Liner Dividing System apparatus and method which has many of the advantages of the Bed Liner Devices mentioned heretofore and many novel features that result in a new Pickup Truck Bed Liner Dividing System which is not anticipated, rendered obvious, suggested, or even implied by any of the prior art Bed Liner Devices, either alone or in any combination thereof It is another object of the present invention to provide a new Pickup Truck Bed Liner Dividing System which may be easily and efficiently manufactured and marketed.

It is a further object of the present invention to provide a new Pickup Truck Bed Liner Dividing System which is of a durable and reliable construction.

An even further object of the present invention is to provide a new Pickup Truck Bed Liner Dividing System which is susceptible of a low cost of manufacture with regard to both materials and labor, and which accordingly is then susceptible of low prices of sale to the consuming public, thereby making such Pickup Truck Bed Liner Dividing System economically available to the buying public.

Still yet another object of the present invention is to provide a new Pickup Truck Bed Liner Dividing System which provides in the apparatuses and methods of the prior art some of the advantages thereof, while simultaneously overcoming some of the disadvantages normally associated therewith.

Still another object of the present invention is to provide a new Pickup Truck Bed Liner Dividing System for preventing cargo of various shapes and sizes from moving within a pickup truck bed.

Yet another object of the present invention is to provide a new Pickup Truck Bed Liner Dividing System which includes a swaged liner, a plurality of vertical cylindrical cavities within the swaged liner, a plurality of pegs for selectively being positioned within the vertical cylindrical cavities adjacent to cargo, and a storage box for storage of the pegs.

Still yet another object of the present invention is to provide a new Pickup Truck Bed Liner Dividing System that prevents cargo, such as water jugs, groceries, lumber, camping equipment and paint cans, from sliding on the bed liner while the pickup truck is in motion or making a sudden stop.

Even still another object of the present invention is to provide a new Pickup Truck Bed Liner Dividing System that is transferable to another pickup truck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
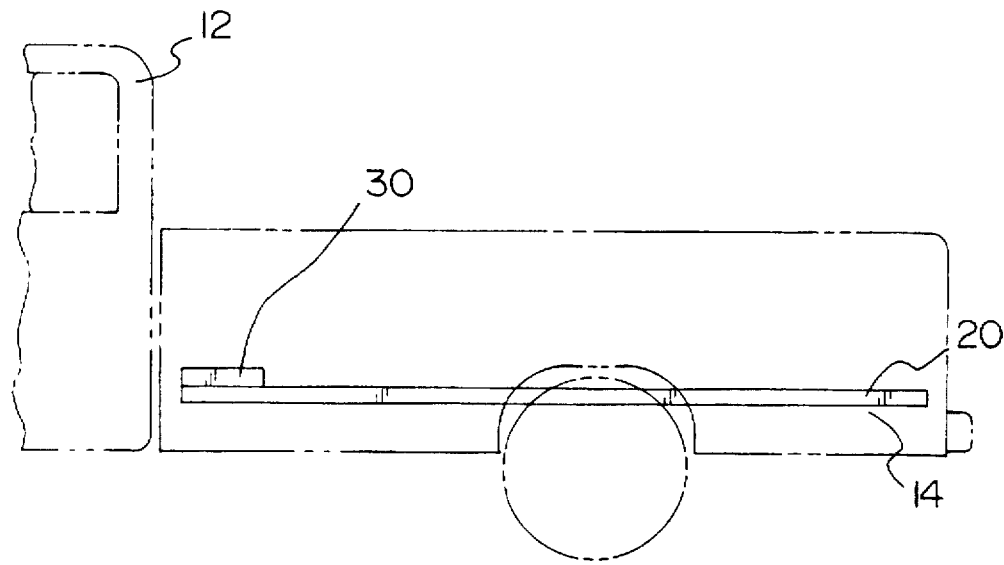
FIG. 1 is an side view of a new Pickup Truck Bed Liner Dividing System secured within t according to the present invention.

With reference now to the drawings, and in particular to FIGS. 1 through 6 thereof, a new Pickup Truck Bed Liner Dividing System embodying the principles and concepts of the present invention and generally designated by the reference numeral 10 will be described.

Figure 2:
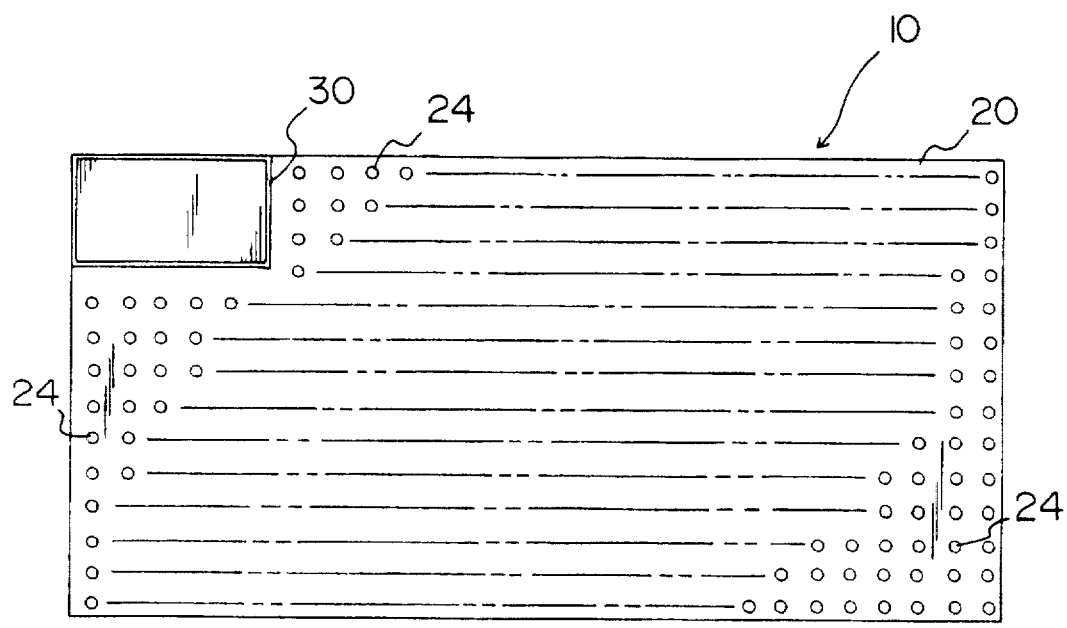
FIG. 2 is a top view of the present invention.
Figure 3:
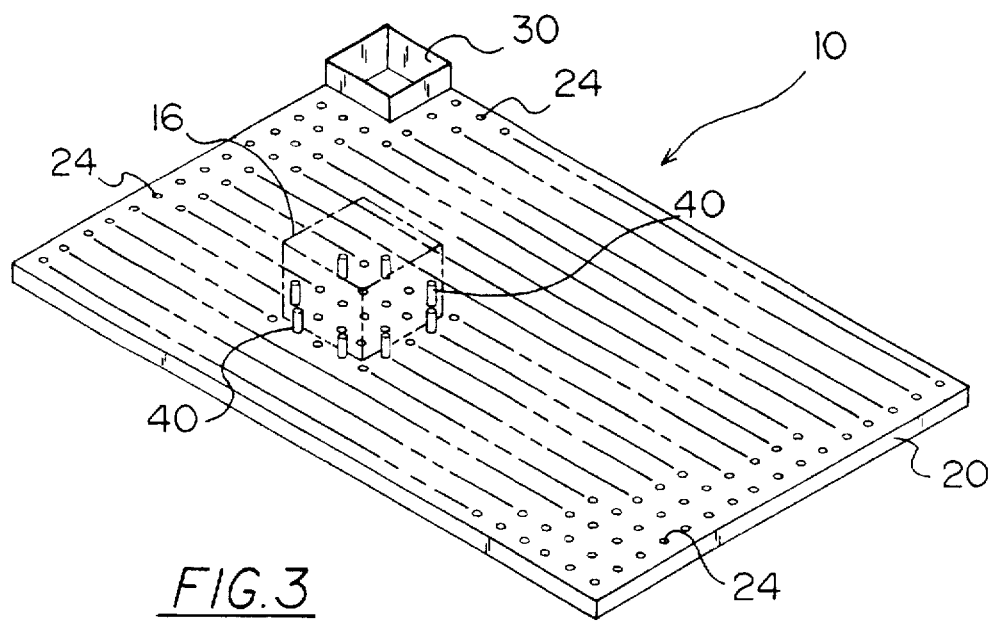
FIG. 3 is an upper side perspective view of the present invention.
Figure 4:
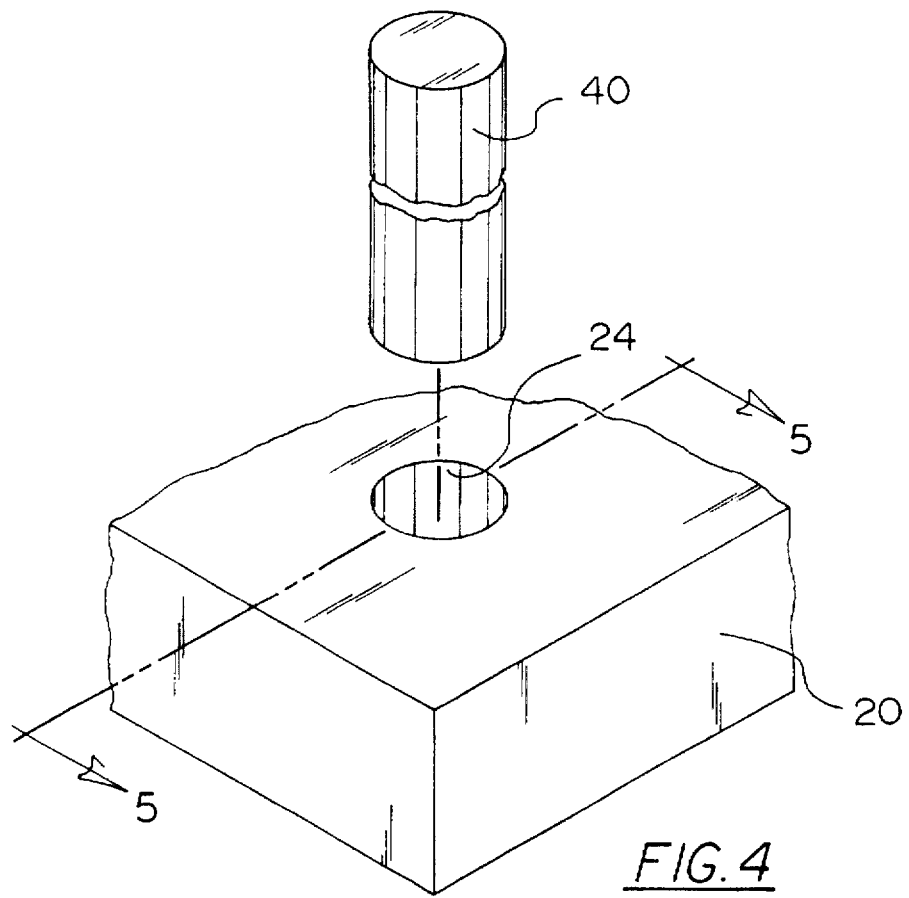
FIG. 4 is a magnified upper side perspective view of the vertical cylindrical cavity.
Figure 5:
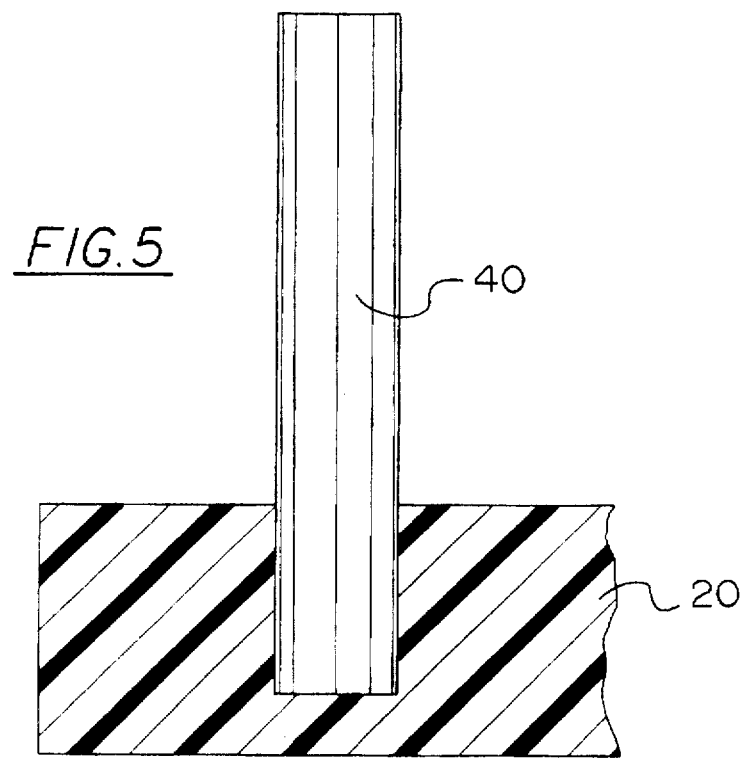
FIG. 5 is a cross sectional view taken along line 5—5 of FIG. 4.
Figure 6:
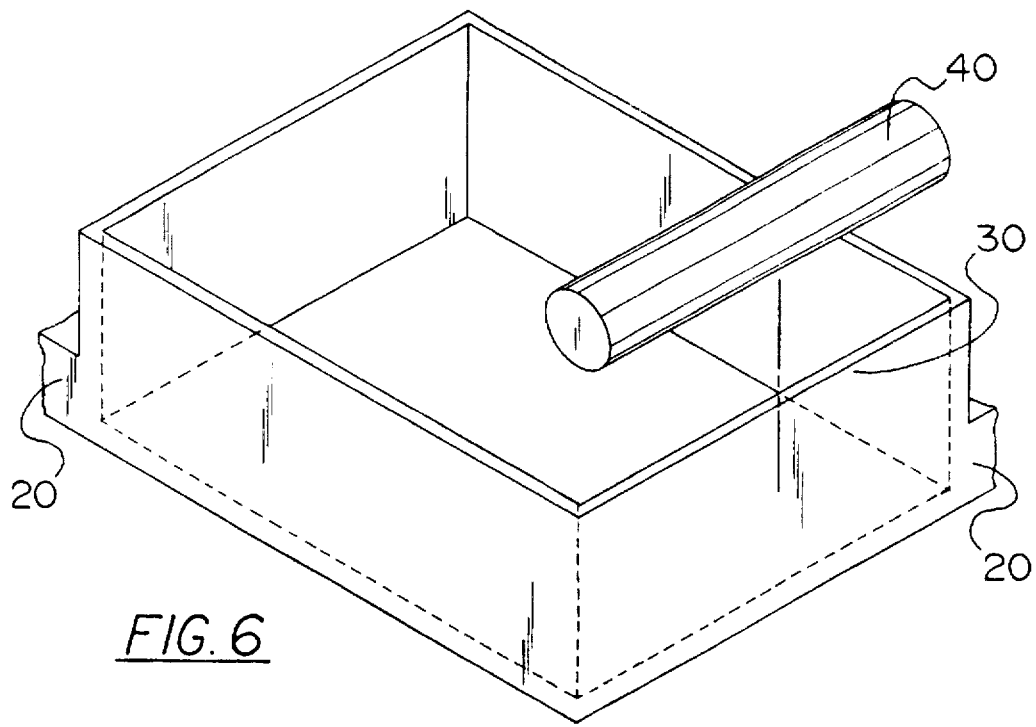
FIG. 6 is a magnified upper side perspective view of the storage box.

As best illustrated in FIGS. 1 through 6, it can be shown that the present invention comprises a swaged liner 20 having a cornice formed to fit onto a bed 14 of a pickup truck 12. The swaged liner 20 has a plurality of vertical cavities 24 into the cornice as best shown in FIGS. 2 through 5 of the drawings. A plurality of pegs 40 are formed to snugly fit into the vertical cavities 24 as shown in FIG. 5 of the drawings. The pegs 40 are selectively positioned adjacent to cargo 16 of various sizes and shapes to prevent the cargo 16 from moving when the pickup truck 12 is in motion as shown in FIG. 3 of the drawings. A storage box 30 is preferably secured to the cornice of the swaged liner 20 for the storage of the pegs 40 during non-use of the pegs 40. The vertical cavities 24 are preferably cylindrical shaped as shown in FIG. 4 and 5 of the drawings. The pegs 40 are also cylindrical shaped for snugly fitting within the vertical cavities 24 which are cylindrical shaped. The vertical cavities 24 are preferably distally spaced in a plurality of straight lines parallel to a longitudinal axis of the pickup truck 12 as shown in FIGS. 2 and 3 of the drawings.

In use, the cargo 16 is positioned onto the swaged liner 20. The pegs 40 are snugly positioned within the vertical cavities 24 adjacent to the cargo 16 to prevent movement of the cargo 16 during motion of the vehicle. The pegs 40 can also be positioned to separate elongated objects, such as lumber, thereby organizing the cargo 16 within the box. When any of the pegs 40 are not in use, the unused pegs 40 are stored within the storage box 30 to prevent cluttering of the pickup truck 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pickup truck bed liner dividing system for insertion into the bed of a pickup truck, the dividing system comprising:
    a liner having a top surface, the liner being adapted to fit onto the bed of the pickup truck;
    said liner including a plurality of vertical cavities formed in said top surface; and
    a plurality of removable pegs formed to snugly fit into said vertical cavities, said pegs being for positioning adjacent to cargo of various sizes and shapes whereby the pegs positioned adjacent to said cargo resist movement of said cargo across the top surface of said liner when the pickup truck is in motion.

2. The pickup truck bed liner dividing system of claim 1, wherein a storage box is secured to said top surface of said liner for the storage of said pegs during non-use.

3. The pickup truck bed liner dividing system of claim 2, wherein said vertical cavities are cylindrical shaped and said pegs are cylindrical shaped for snugly fitting within said vertical cavities.

4. The pickup truck bed liner dividing system of claim 3, wherein said vertical cavities are distally spaced in a plurality of straight lines parallel to a longitudinal axis of said pickup truck.

5. The truck bed liner system of claim 1, wherein each said peg has a longitudinal length and each cavity has a depth, the length of each said peg being at least twice the depth of each said cavity.

6. The truck bed liner system of claim 1, wherein each said cavity is terminated by a bottom wall such that a peg inserted into said cavity is prevented from slipping through said liner.

7. A truck bed liner dividing system for use in pickup trucks having a truck bed, the liner dividing system comprising:

a liner adapted to fit within the truck bed of the pickup;

the liner having a top surface and a plurality of vertical cavities, each cavity extending into the liner;

a plurality of round pegs, each peg snugly insertable into any one of the cavities such that the peg extends upwardly from the respective cavity;

said plurality of cavities being aligned in a number of rows running parallel to a longitudinal axis of the liner; and a storage box integrally formed by a number of connected walls disposed upwardly from the liner, the storage box being positioned in a corner of the liner, the storage box further being able to hold a number of the plurality of pegs.

* * * * *